United States Patent [19]

Moss et al.

[11] Patent Number: 4,960,311

[45] Date of Patent: Oct. 2, 1990

[54] HOLOGRAPHIC EXPOSURE SYSTEM FOR COMPUTER GENERATED HOLOGRAMS

[75] Inventors: Gaylord E. Moss, Marina del Rey; John E. Wreede, Monrovia, both of Calif.

[73] Assignee: Hughes Aircraft Company, Los Angeles, Calif.

[21] Appl. No.: 401,394

[22] Filed: Aug. 31, 1989

[51] Int. Cl.$^5$ .............................................. G03H 1/08
[52] U.S. Cl. .................................. 350/3.66; 350/3.67
[58] Field of Search ...................... 350/3.6, 3.66, 3.67, 350/3.69, 3.81, 3.83

[56] References Cited

U.S. PATENT DOCUMENTS

| | | | |
|---|---|---|---|
| 4,111,519 | 9/1978 | Gillis et al. | 350/3.66 |
| 4,155,630 | 5/1979 | Ih | 350/3.67 |
| 4,456,328 | 6/1984 | Arnes et al. | 350/3.6 |
| 4,458,977 | 7/1984 | Arnes et al. | 350/3.6 |
| 4,458,978 | 7/1984 | Arnes et al. | 350/3.67 |
| 4,478,490 | 10/1984 | Wreede et al. | 350/3.81 |

*Primary Examiner*—Bruce Y. Arnold
*Assistant Examiner*—J. Ryan
*Attorney, Agent, or Firm*—Leonard A. Alkov; Wanda K. Denson-Low

[57] ABSTRACT

A computer generated diffraction grating which exhibits multiple order scattering noise is illuminated by a point source to generate a first wavefront which is intersected with a second wavefront to form a desired interference pattern in a recording medium. The point source is moved relative to the recording medium during exposure in order to reduce multiple order scattering noise.

5 Claims, 1 Drawing Sheet

HOLOGRAPHIC EXPOSURE SYSTEM FOR COMPUTER GENERATED HOLOGRAMS

BACKGROUND OF THE INVENTION

1. Field of the Invention

This invention relates to a system and method for exposing holograms and, more particularly, to a system and method for forming master holograms from a computer generated two-dimensional amplitude hologram in an efficient and economic manner while substantially reducing undesirable spurious hologram noise recordings.

2. Description of Related Art

High quality holographic optical elements are used in diffraction optics display systems, such as Heads Up Displays (HUD), for advanced aircraft, helmet mounted displays, laser eye protective devices, narrow band reflective filters, and holographic high gain screens for simulators. These are only a few of the many uses of high quality reflective holograms. There have existed problems in the prior art in providing economical mass production of reflective holographic optical elements where the production units are "copies" of either a master reference object or a master hologram, which provides an aspheric reflective wavefront for a HUD.

A constant problem in diffraction optic display systems utilizing a hologram has been a degradation of the holographic images as a result of the effects of spurious reflection and transmission hologram recordings that are frequently generated during the holographic replication process. The spurious noise holograms have been found to be generated by reflections from surfaces which are interfaces of materials of different indexes of refraction, such as air/glass interfaces of the transparent surfaces of the recording cover plate, the substrate, the recording medium, and optical elements. These reflections can combine with the primary holographic beams at the recording film to form both spurious reflection hologram recordings and spurious transmission hologram recordings. As a result, a subsequent display system will create ghost images from the spurious reflection hologram recordings and rainbow-like flare patterns from the spurious transmission hologram recordings.

The prior art has attempted to address these problems in numerous different ways. One approach has been to minimize the differences in index refraction by attempting to match the indexes of refraction with an index matching fluid, such as a mineral oil. Attempts have been made to immerse a recording module in an index of refraction matching oil bath. Another approach has been to form a hologram with energy beams impinging the recording film supporting elements at the Brewster's angle.

U.S. Pat. Nos. 4,458,977, 4,458,978, and 4,456,328 disclose prior art approaches to eliminate the noise caused by a glass/air interface of an outer surface cover plate by moving the cover plate to change the phase during the recording period so that spurious holograms are not formed. The rate of movement or phase change in accordance with these solutions is a function of the exposure time which itself is a function of the sensitivity of the recording medium. The total amount of the movements were designed to require a phase change of one or more half wavelengths in the reflected noise beams to nullify any constructive or destructive interference patterns. These approaches have been proposed to solve the complex problems involved in the manufacturing of reflective holographic optical elements for use in heads up displays.

Generally, prior art solutions employ a layer of index matching fluid, such as an appropriate mineral oil, which will vary in thickness during the cover movement. A relatively thick image degrading layer of index matching fluid has the capacity to degrade the surface of the reference object, such as an aspheric mirror, create moving striations causing fringe degradation and frequently requires the oil to be cleaned. Initially, a double beam system was utilized which required days of stabilization before an appropriate exposure. Subsequently, a master aspheric mirror single beam system was utilized, however, it still required many hours of stabilization and the use of relatively skilled labor.

Additionally, in the prior art approaches, only the outer surface, that is, the glass/air interface elements, could be provided with an antireflective coating. If an inner surface was required to be coated for optimum use in air, the antireflective coating would have to be added at a later time after the exposure, such as by adding an antireflective coated glass, which would add further weight, or by depositing a standard antireflective coating, which would frequently thermally destroy the hologram, or by depositing a cold antireflective coating, which would be less efficient and more fragile. Finally, this example of prior art required a piezoelectrically controlled exposure cover that had to be appropriately mounted and calibrated prior to exposure.

U.S. Pat. No. 4,478,490 discloses an alternative method of reducing coherent noise content through the modulation of the position of an apodizer in the optical path during an exposure. The apodizer permits the amplitude of the wavefront to be modified to alter a point source response, that is, to change in a predetermined way the point spread function whereby the fringe patterns created by the apodizer are unstable and hence reduce the noise content of the transmitted radiation.

Another prior art attempt to remove noise has been the use of a laser source without an etalon to reduce noise holograms from a surface further away than approximately two inches (for a large argon laser coherence length). While this can reduce noise, it has the disadvantage of being a step process with either the etalon being in and the coherence length being many meters or the etalon being not in, and the coherence length being on the order of inches. This approach can be acceptable where a distance of approximately one-quarter-inch is required, such as in a HUD type hologram with an aspheric mirror surface.

The prior art has frequently recognized the desirability of reproducing copies from a master hologram. A theory of such copying of holograms is set forth in Brumm, "Copying Holograms," Applied Optics, Volume 5, No. 12, page 1946, December 1966. Reference is also made to U.S. Pat. Nos. 3,758,186, 3,639,031, 3,647,289, 4,312,559, and 4,530,564 to disclose other methods of copying holograms.

In modern aircraft, there is frequently minimal space in the cockpits. This limitation requires that any optical system be folded and compressed for a heads up display. As a result, complex aspheric reflecting mirrors are required and holograms producing such an effect represent a lightweight and efficient solution to this requirement. As mentioned above, aspheric mirrors have been fabricated for use as a master reference in producing HUD holograms. This approach involves a lengthy and expensive procedure of grinding an aspheric mirror to the subjective requirements of a particular heads up display. An aspheric mirror also creates a problem since it has a nonspherical surface and there is a limitation as to how close the aspheric reference member can be placed relative to the recording material for replicating the aspheric diffraction grating in the recording medium. Replication from a master hologram, while retaining the optical qualities of an aspheric mirror reference mirror, would be highly desirable.

It has been known in the prior art to provide computer generated holograms. In this regard, the design of the desired wavefront is mathematically described and a computer can then form a two-dimensional amplitude hologram representative of that wavefront. The computer can drive a printer to produce the desired diffraction grating on a substrate or alternatively create the grating by electronic or chemical procedures. A major problem in using a computer generated hologram as an initial imaging source for the fabrication of a holographic HUD combiner is the noise in the hologram. This noise is present in the form of a general nonuniformity of brightness and in multiple order scattering. The computer generated hologram has multiple order noise because the fringe pattern is generally formed to be abrupt discrete units rather than sinusoidally varying as in an ideal holographic recording of a laser interference pattern.

The prior art is still seeking an optimum method and apparatus for the reproduction of multiple hologram optical elements in an economical and efficient manner, including improving the format of providing a recording module for HUD manufacturing and reducing the creation of noise in the HUD hologram.

SUMMARY OF THE INVENTION

A method and apparatus for exposing a recording medium with a computer generated diffraction grating to remove multiple order scattering noise is provided. In one embodiment a computer generated two-dimensional amplitude hologram can provide one wavefront necessary to form a master hologram that will be replicated in the production of complex optical elements, such as for use with a HUD combiner. A second wavefront, for example, reflected off of a reference surface will interact within the recording member to provide a desired master hologram that can be used for multiple replications in producing aspheric reflecting surfaces for a HUD combiner. A point source of coherent illumination is provided for illuminating the computer diffraction grating and the point source is controllably moved during the exposure to reduce the multiple order scattering noise. By providing a slight movement, the desired recording ray is only changed slightly. However, the noise scattering rays which are the result of individual scattering elements rather than the diffraction effect of the complete assemblage of the fringe pattern are displaced by a substantial distance. As a result of moving the point source during the recording, the scatter holograms are reduced by being smeared out with minimal effect on the main hologram. An additional feature of the present invention is the capacity to change the wavelength of the point source to provide a variable wavelength scan to compensate for any variation in the formation of fringe spacing in the recorded diffraction grating. Thus, in those cases where the fringe spacings can be changed substantially the same by shifting the source point position, the wavelength of the laser may also be shifted slightly to maintain fringe spacing and position for each multiple exposure. An interferometer measurement can be utilized to measure the displacement and to determine the amount of wavelength shift to compensate.

In those circumstances where the illumination point position change does not shift fringe spacing equally, it is also possible to drive the laser wavelength to be shifted continuously around the exposure area to effectively smear out any spurious noise holograms.

In an alternative embodiment, the computer generated diffraction grating can comprise the desired wavefront by itself and a beam splitter can direct a portion of the point source, such as a laser, for interference with the diffracted wavelight passing through the computer generated hologram in the recording material.

A feature of the present invention is the utilization of a point source during the exposure of the computer generated hologram with a relative movement between the point source and the recording medium. The movement of the point source is such that any relative phase change in the desired primary recording rays is relatively small since the relative path changes are also small. However, any noise creating a spurious hologram will experience a path change over a much greater distance and therefore there will be relatively greater shifts in the fringes for a noise hologram. If these phase shifts reach half a wavelength, the noise hologram will be essentially wiped out. However, the amount of shift in the primary hologram will only be approximately one twentieth of the design wavelength, which will not measurably reduce the efficiency compared to the advantages of eliminating noise.

BRIEF DESCRIPTION OF THE DRAWINGS

The novel features that are considered characteristic of this invention are set forth with particularity in the appended claims. The invention itself, both as to its organization and method of operation as well as additional objects and advantages thereof, will best be understood from the following description when read in connection with the accompanying drawings, in which like reference numbers refer to like parts, and in which:

DESCRIPTION OF THE PREFERRED EMBODIMENTS

Figure 1:
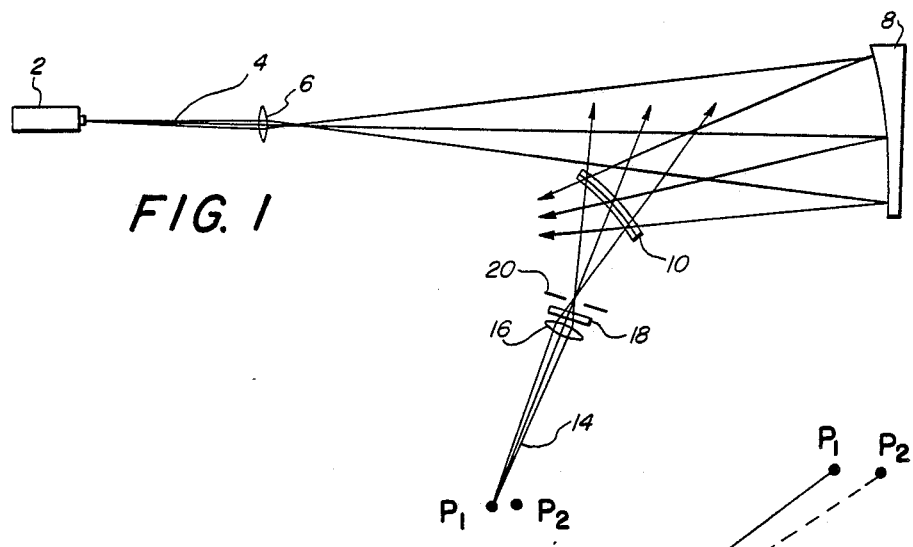
FIG. 1 is a schematic view of an exposure system for developing a HUD aspheric reflective hologram.

The following description is provided to enable any person skilled in the holographic field to make and use the invention, and sets forth the best modes contemplated by the inventors for carrying out their invention. Various modifications, however, will remain readily apparent to those skilled in the above art, since the generic principles of the present invention have been defined herein specifically to provide a relatively economical method and apparatus for producing holographic copies of a master reference member by moving a point light source.

The present invention recognizes the advantages of using a computer generated hologram in the manufacturing of complex optical elements, such as aspheric reflections used in heads up displays. Such a hologram represents a two-dimensional amplitude grating of a desired wavefront to provide the effect of an aspheric mirror configuration necessary to meet the constraints and optical performance required in the cockpit of an advanced aircraft. As can be appreciated by a person of skill in this field, computer generated hologram fabrications have existed in the past. A mathematical description of the hologram is defined in the computer program to represent the desired wavefront to be replicated. In order to simplify the computer hologram as much as possible, the description of any wavefront deformation that could be achieved with conventional spherical or cylindrical optical elements is eliminated. The resultant design is capable of providing an aspheric mirror effect for a HUD combiner with predicted optical aberrations of less than 0.2 millirad to thereby provide excellent display images.

In the actual fabrication of the computer generated hologram, the computer can drive an appropriate recording instrument, such as a laser printer, an ion beam, development of a photoresist pattern, etc., to etch, deposit or remove material to form a pattern of a two-dimensional amplitude wavefront. The use of computer generated holograms removes the long time period and high expense of custom manufacturing an aspheric mirror as the reference object in the production of the replication holograms for actual assembling into HUD combiners. A computer generated hologram also provides a large number of design variables permitting changes in the design that were not possible with the grinding of an aspheric mirror.

However, a problem with using a computer generated hologram is that different orders of noise are inherently present in the fringe patterns, and scatter noise from the discrete elements of the grating present a significant problem. It is particularly necessary to reduce this noise because only low efficiency results can be achieved in the use of a computer generated hologram in a two-beam holographic system with a single exposure. Accordingly, it is necessary to provide very long exposure times and there is extreme difficulty in maintaining stability during the exposure periods. Exposure times can approach several hours with dichromated gelatin, which presently is the preferred recording medium for HUDs.

Thus, the major problem in using a computer generated hologram as the initial imaging source for the fabrication of a holographic HUD combiner is the noise in the hologram. This noise has two forms: first, a general, nonuniformity brightness, and second, a multiple order scatter noise. The computer generated hologram contains multiple order scatter noise because the fringe pattern is usually developed as an abrupt on or off condition, rather than a sinusoidally varying condition, as would be appropriate in an ideal holographic recording of a laser interference pattern.

FIG. 1 is a schematic illustration of an exposure system for producing a master hologram from which production holograms for HUD combiners can be manufactured. A laser 2 generates a reference beam 4 which can be directed through conventional optics 6 against a reflecting mirror 8 to form the reference wavefront for impacting upon a recording module 10 containing, for example, a dichromated gelatin as a recording material.

Another beam from the same laser 2 forms the object beam 14 which is directed through an optic system 16 to contact the computer generated two-dimensional amplitude hologram 18. A spatial filter 20 permits the focusing of at least one of the orders to a point and attempts to block all but that one point to eliminate other orders and some of the noise in that one order. Spatial filters, however, do not eliminate low spatial frequency noise, and optical designs do not always allow for focusing to a small enough point, since the computer generated hologram is formed of discrete elements that are particularly subject to generating scattering noise. The hologram 18 is used to shape the object wavefront which, together with the reference wavefront, will form the master hologram in the recording medium 10 that can be replicated in the production of actual HUD combiners.

As can be appreciated, FIG. 1 is not drawn to scale, and the point P2 shown in FIG. 1 represents a feature of the present invention to reduce the scattering noise by integrating the speckle scatter. Thus, the source of the object beam 14 can be moved to position P2 during the exposure of the recording module 10. Reference is also made to the schematic illustration of FIG. 2 to explain the present invention. The discrete elements of the computer generated hologram 18 show the result of scattering noise as a ray S1. The desired recording beam is disclosed as R1. When the light source is moved to position P2 the recording beam R1' is only slightly displaced from the position of R1. However, the scattering noise ray S1' is significantly moved and, therefore, any resulting scatter hologram that is inadvertently recorded will be reduced by being smeared out with a minimal effect on the main hologram recording.

Figure 2:
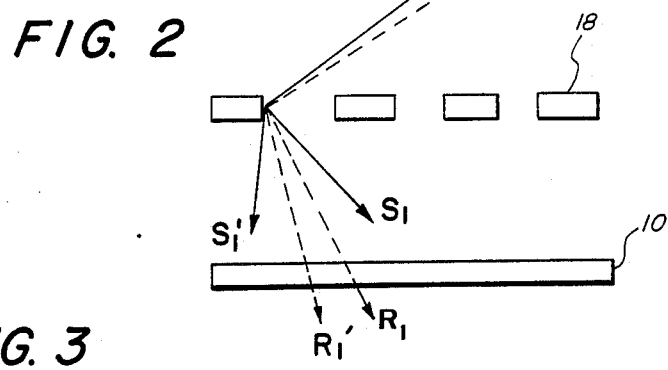
FIG. 2 is a schematic view, exaggerated, showing the effects of movement of the point source.

As mentioned, the illustrations of FIG. 1 and also FIG. 2 have been exaggerated to disclose the principles of the present invention. The actual movement will depend on the particular hologram being formed but should be within a magnitude of less than 2 mm over a distance of approximately 20 inches. The net result of this movement of the point source 12 during the exposure of the recording module is a cleaner, higher contrast image in the master hologram An alternative embodiment of the present invention could use a variable wavelength laser or tunable laser with an etalon, such as a dye laser, to vary the wavelength of the recording laser during the shift in the position of the point source. Thus, the point source can be a variable wavelength laser which will coordinate the shifting of the wavelength between position P1 and position P2 so that the shift does not affect the holographic fringe spacing in the desired hologram recording. This can be of particular advantage in those cases where multiple exposures are required, such as in HUD environments, and the fringe spacings are changed substantially by a shift in the source point position. Multiple exposures are necessary when low efficiency results, for example, in a two-beam holographic system. Accordingly, the wavelength of a laser may be simply shifted slightly as required to maintain fringe spacing and position for each multiple exposure.

Figure 3:
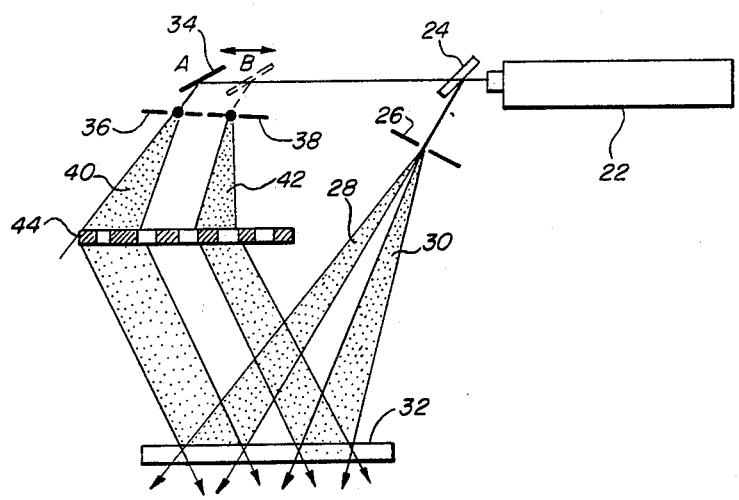
FIG. 3 is an alternative embodiment of the present invention showing an exposure of a computer generated diffraction grating with a variable wavelength source.

In those cases where a point source position change does not shift the fringe spacing equally, the laser wavelength may be shifted continuously around the exposure area. FIG. 3 shows an alternative embodiment for providing a variable wavelength that is continuously varied to smear the resultant noise holograms. In this regard, the variable wavelength laser 22 projects a laser beam through a beam splitter 24, and a portion of the beam is directed at a spatial filter 26 to form the reference beams 28 and 30 for direction to a recording medium 32 which can be, for example, a dichromatic gelatin. A mirror 34 is movably mounted to vary its positions between points A and B. Again, spatial filters 36 and 38 can be used to eliminate some of the higher orders from a desired one. As can be appreciated, the ray direction can be obliquely positioned to be off-axis relative to the recording material 32 to assist in the positioning of the spatial filters. Object beams 40 and 42 can be generated, and, after contact with the computer generated hologram 44, they can contact the recording gelatin for interference with the reference beams to form the desired master holographic diffraction grating. During this operation, the wavelength can be varied about a predetermined coherence length so that the scatter noise, which traverses a larger optical path than the recording beams, will blur the fringes of the spurious noise hologram and effectively remove them from the master hologram.

When it is desired to vary the laser wavelength, it is possible to use an interferometer to measure a predetermined portion of the pattern and to accordingly adjust the wavelength to maintain that position in the pattern stable to thereby balance the variation of the wavelength with the fringe spacing and accordingly use the wavelength to compensate for the movement of the point source. Since the desired effect is a relative movement between the point source and the recording medium, it can be seen that the recording medium can also be displaced to achieve the same effect. Additionally, other optical elements can be utilized to produce the desired, controlled, predetermined movement of the point source to achieve the purpose of the present invention.

As can be appreciated by a person of ordinary skill in the holographic field, various objective parameters are involved in recording a hologram. For example, the recording material, such as dichromatic gelatin, is derived from a natural source and can provide different exposure characteristics and developing time periods. Additionally, the particular design wavelength and the availability of a constant light intensity for such a design wavelength for a particular hologram will have to be computed and will affect the specific parameters of any exposure system. For example, a hologram used as an aspheric reflector in a HUD combiner preferably have a design wavelength to maximize the reflection of light from a cathode ray tube. This wavelength is not readily available in a laser source and computations are made in both the design of the reference member and the development of the exposed hologram to allow for this variance.

In essence, there are numerous variables that are subjectively determined when producing holograms and people of ordinary skill in this field are aware that such variables exist and, when determined as to a particular value, can readily provide a prediction of the results of the process of producing a hologram. Accordingly, when evaluating the features of the present invention and determining its scope, the invention solely should be measured from the following claims.

What is claimed is:

1. A system for exposing a recording medium with a computer generated diffraction grating which exhibits multiple order scattering noise when illuminated comprising:
    a point source of illumination positioned to direct light at the diffraction grating for exposing the recording medium;
    means for relatively moving the point source during the exposure to reduce the multiple order scattering noise;
    means for interacting with the point source to form a desired interference pattern; and
    means for varying the wavelength of the point source to compensate for any variation in formation of fringe spacing in the recorded interference pattern.

2. A system for exposing a hologram comprising:
    a recording medium;
    a computer generated diffraction means for providing a first wavefront when illuminated, said diffraction grating being positioned next to the recording medium;
    means for directing a point source of illumination at the diffraction grating and for relatively moving said point source during the exposure of the recording medium;
    means for providing a second wavefront to the recording medium whereby the respective first and second wavefronts interact to form the desired interference pattern in the recording medium; and
    means for varying the wavelength of the point source to compensate for any variations in formation of fringe spacing in the recorded interference pattern.

3. The invention of claim 2 wherein the wavelength of the point source is varied during exposure of the recording medium.

4. A method of exposing a hologram comprising of the recording medium
    providing a recording medium;
    providing a computer generated diffraction grating providing a first wavefront when illuminated;
    illuminating the computer generated diffraction grating with a point source of illumination to direct the first wavefront at the recording medium;
    forming a second wavefront from a reference object;
    directing the second wavefront at the recording medium to interact with the first wavefront to form the desired interference pattern in the recording medium; and
    relatively moving the point source of illumination during exposure of the recording medium, wherein the wavelength of the point source is varied to compensate for any variations in formation of the fringe spacing in the recorded interference pattern.

5. The method of claim 4 wherein the wavelength of the point source is varied during exposure of the recording mediums.

* * * * *